United States Patent
Bilger et al.

(10) Patent No.: US 11,959,478 B2
(45) Date of Patent: Apr. 16, 2024

(54) DEVICE FOR RECIRCULATING AN AT LEAST PARTIALLY GASEOUS COMPOSITION CONTAINING HYDROGEN AND FUEL CELL SYSTEM

(71) Applicant: Busch Produktions GmbH, Maulburg (DE)

(72) Inventors: Théo Bilger, Helfrantzkirch (FR); Boris Kossek, Rheinfelden (DE); Matthias Benz, Lörrach (DE); Yohann Perrot, Pont-de-Roide (FR)

(73) Assignee: BUSCH PRODUKTIONS GMBH, Maulburg (DE)

(*) Notice: Subject to any disclaimer, the term of this patent is extended or adjusted under 35 U.S.C. 154(b) by 27 days.

(21) Appl. No.: 17/791,053

(22) PCT Filed: Feb. 17, 2020

(86) PCT No.: PCT/EP2020/054026
§ 371 (c)(1),
(2) Date: Jul. 6, 2022

(87) PCT Pub. No.: WO2021/164843
PCT Pub. Date: Aug. 26, 2021

(65) Prior Publication Data
US 2023/0013325 A1    Jan. 19, 2023

(51) Int. Cl.
*F01C 19/00* (2006.01)
*F03C 2/00* (2006.01)
(Continued)

(52) U.S. Cl.
CPC .......... *F04C 18/123* (2013.01); *F04C 27/009* (2013.01); *F04C 29/0035* (2013.01);
(Continued)

(58) Field of Classification Search
CPC ...... F04C 18/123; F04C 18/126; F04C 18/16; F04C 18/18; F04C 23/008; F04C 27/005;
(Continued)

(56) References Cited

U.S. PATENT DOCUMENTS 3,975,123 A * 8/1976 Schibbye .............. F04C 27/009
418/102
2003/0198554 A1* 10/2003 Ray ........................ F04D 29/108
415/113
(Continued)

FOREIGN PATENT DOCUMENTS

CN         110319004 A      10/2019
EP         0 859 154 A1      8/1998
(Continued)

OTHER PUBLICATIONS

JP-2007132243-A—Fujisawa et al. May 31, 2007—Screw Compressor—the English Machine Translation. (Year: 2007).*
(Continued)

*Primary Examiner* — Theresa Trieu
(74) *Attorney, Agent, or Firm* — Pearne & Gordon LLP (57) ABSTRACT

A dry rotary pump for recirculating an at least partially gaseous composition containing hydrogen. The dry rotary pump comprising a first rotating shaft and a second rotating shaft. The first rotating shaft and the second rotating shaft are driven in rotation by a drive system in a gear chamber. The dry rotary pump comprises a first pair of seals and a second pair of seals, each comprising a first shaft seal and a second shaft seal. The dry rotary pump comprises a pressure equalization chamber in fluid connection with a gap between the first shaft seal and the second shaft seal to regulate pressure in the gap. The gear chamber is in fluid connection with the gap, and the pumping chamber is in fluid connec-
(Continued)

tion with the first shaft seal and the first shaft seal by a pulsation attenuation chamber.

20 Claims, 11 Drawing Sheets (51) Int. Cl.
*F03C 4/00* (2006.01)
*F04C 2/00* (2006.01)
*F04C 18/12* (2006.01)
*F04C 27/00* (2006.01)
*F04C 29/00* (2006.01)
*F04C 29/02* (2006.01)
*H01M 8/04089* (2016.01)

(52) U.S. Cl.
CPC ........ *F04C 29/0092* (2013.01); *F04C 29/026* (2013.01); *H01M 8/04089* (2013.01); *F04C 2210/224* (2013.01); *F04C 2240/603* (2013.01)

(58) Field of Classification Search
CPC ............... F04C 27/009; F04C 29/0035; F04C 29/0092; F04C 29/023; F04C 29/026; F04C 2240/40; F04C 2240/60; F04C 2240/603; F04C 2210/1055; F04C 2210/1072; F04C 2/123; F04C 2/126; F04C 2/16; F04C 2/18; F04C 15/0023; F04C 15/0026; F04C 15/0038; F04C 15/0042; F04C 15/0049; Y02E 60/50
See application file for complete search history.

(56) References Cited

U.S. PATENT DOCUMENTS

2011/0256003 A1* 10/2011 Ohtsubo ................. F04C 18/00
                                                        417/410.4
2019/0072093 A1*  3/2019 Tajima .................. F04C 27/009

FOREIGN PATENT DOCUMENTS

| EP | 1 975 410 A1 | 10/2008 | |
|---|---|---|---|
| JP | H07-317553 A | 5/1995 | |
| JP | 2007132243 A * | 5/2007 | ............. F04C 18/16 |

OTHER PUBLICATIONS

International Search Report and Written Opinion in PCT/EP2020/054026, dated Nov. 17, 2020, 18 pages combned.

* cited by examiner

DEVICE FOR RECIRCULATING AN AT LEAST PARTIALLY GASEOUS COMPOSITION CONTAINING HYDROGEN AND FUEL CELL SYSTEM

TECHNICAL FIELD OF THE INVENTION

The present invention relates to a first aspect in the field of devices for the recirculation of an at least partially gaseous composition, in particular an at least partially gaseous composition containing hydrogen. The present invention relates more specifically to the field of devices for the recirculation of an at least partially gaseous composition containing hydrogen in a fuel cell, in particular a fuel cell for motor vehicles. In a second aspect, the present invention relates to a fuel cell system allowing the recirculation of an at least partially gaseous composition containing hydrogen.

STATE OF THE ART

In a fuel cell system, gaseous hydrogen and oxygen are necessary for the production of electricity. In order to contribute to removing the water generated by the reaction of the hydrogen and of the oxygen of the fuel cell, the latter is provided with gas with a gas flow greater than that which is transformable.

Thus, a fuel cell discharges an at least partially gaseous composition containing unreacted gaseous hydrogen (called hydrogen exhaust gas) which has not been used in the fuel cell. In order to be able to use this hydrogen exhaust gas, the fuel cell system is equipped with a hydrogen recirculation circuit to refeed the fuel cell with the hydrogen exhaust gas. To do this, the hydrogen recirculation circuit is normally equipped with a hydrogen recirculation device.

It is known from the prior art to use an ejector or a Roots type pump as hydrogen recirculation device. The latter is composed of the pump part and the motor part comprising an electric drive motor. A rotating shaft extends from the electric motor of the motor unit to the pumping unit, and a pair of rotors is accommodated in the pumping chamber. When the two rotors are set in rotation by the rotation of the rotating shaft driven by the motor, the hydrogen exhaust gas is suctioned in the pumping chamber, then discharged from the latter and reintroduced in the fuel cell.

It is important that a pump dedicated to the recirculation of the hydrogen is configured in such a fashion so as to prevent the hydrogen exhaust gas suctioned in the pumping chamber from penetrating into the motor unit or to prevent the concentration of hydrogen in the motor unit from reaching a value at which a danger of explosion is present. To do this, the known prior art devices use a shaft seal which is normally provided between the gear chamber and the motor around the rotating shaft or shafts. The shaft seal is provided to prevent leakages of gaseous hydrogen from the pumping chamber along the rotating shaft towards the motor, thus preventing the concentration of hydrogen in the motor unit from becoming an explosive atmosphere.

However, the gaseous hydrogen can pass through the shaft seals. Some of the hydrogen thus diffuses from the pumping chamber towards the motor unit producing a potentially dangerous increase in the concentration of hydrogen in the motor. In order to resolve this problem, hydrogen pumps have been proposed in which a flow of gas is actively introduced in the motor unit to pass through the latter and to transport with it the hydrogen which has potentially passed through the shaft seal.

Unfortunately, although these pumps make it possible to limit the risk of explosion due to an increase in the concentration of hydrogen in the motor unit, these pumps do not ensure that the molecules of water which are contained in the at least partially gaseous composition to be recirculated cannot enter the chamber for driving of the pump and/or into the motor unit. Such a contamination of the interior of the pump is problematic because it usually causes a malfunction of the pump.

A hydrogen pump, in particular a pump for the recirculation of hydrogen in fuel cells in the automotive field, must in addition meet a number of supplementary requirements, i.e. (the list is not exhaustive):

- meet the norm for maximal external leakage of hydrogen of 10 Ncm$^3$/h;
- be able to function in a wide adjustment range which can extend up to a ratio of 1:20 and, in particular, reach a maximal speed of 12 000 rev/min;
- must be able to function in a wide range of ambient temperatures and of gas input, in particular from −40° C. to 100° C.;
- must be able to function, owing to supply voltages for the fuel cell, at nominal voltages of 12 to 800 VCC, particularly 24 VCC, 48 VCC, 200 VCC, 400 VCC or 750 VCC and must have an elevated efficiency; and
- must, owing to the sensitivity of bipolar plates of the fuel cell or of the membranes with respect to substances such as lubricants, use adapted substances in the pumping chamber and in the motor unit.

The main challenge thus resides in the different behaviour of the fuel cell, such as the different operational cycles and operational pressures, the temperatures in the automotive sector, the quantity of water, etc.

Consequently there exists a need for a robust and flexible pump, such that it meets all the above-mentioned requirements in combination and making it possible to circumvent the above-mentioned problems of the known systems.

SUMMARY OF INVENTION

One object of the present invention is thus to propose a device for recirculation of an at least partially gaseous composition containing hydrogen allowing the aforementioned limitations to be overcome.

According to the invention, these objects are achieved by means of the subject matter of the two independent claims. The more specific aspects of the present invention are described in the dependent claims as well as in the description.

In a more specific way and according to a first aspect, one object of the invention is attained by a device for recirculation of an at least partially gaseous composition containing hydrogen, wherein the device is a dry rotary pump comprising a first rotating shaft and a second rotating shaft driving respectively a first piston with claws and a second piston with claws in rotation in a pumping chamber comprising an inlet orifice and an outlet orifice for the gaseous composition, the first rotating shaft and the second rotating shaft being configured to be driven in rotation by a drive system situated in a gear chamber, the device comprising a first pair of seals and a second pair of seals, each comprising a first shaft seal and a second shaft seal, the first pair of seals being provided around the first rotating shaft and the second pair of seals being provided around the second rotating shaft between the pumping chamber and the gear chamber, the device comprising a pressure equalization chamber which is in fluid connection with a gap situated between the first shaft seal and the second shaft seal of the first and of the second pair of shaft seals to regulate the pressure in the gap, wherein the gear chamber is in fluid connection with the gap, and wherein the pumping chamber is in fluid connection with the first shaft seal of the first pair of shaft seals and with the first shaft seal of the second pair of shaft seals by a pulsation attenuation chamber.

A device according to the present invention allows for the pressure acting on the two sides of the shaft seals, which ensure the tightness of the pumping chamber with respect to the gear chamber, to be equalized. Thanks to the equalization of this pressure, the frictional force between the shaft seals and the rotating shafts around which they are mounted always remains the same which makes it possible to avoid a premature attrition of the shaft seals and thus the contamination of the gear chamber with the molecules of water in gaseous or liquid form and/or the contamination of the pumping chamber with the molecules of lubricating liquid present in the gear chamber. In an advantageous way, the first pair of seals is made of fluoroelastomer, for example of Viton™, which renders these seals resistant to oil, and the second pair of seals is made of polytetrafluoroethylene (PTFE), which makes these seals resistant to substances present in the process of creation of electricity in a fuel cell, for example water, hydrogen and nitrogen.

In a first preferred embodiment of the present invention, at least one of the shaft seals among the first shaft seal of the first pair of shaft seals, the second shaft seal of the first pair of shaft seals, the first shaft seal of the second pair of shaft seals and the second shaft seal of the second pair of shaft seals is a lip seal. Thanks to the use of a lip seal, the device according to the present invention can be implemented in a particularly simple way. Moreover, the use of a lip seal allows a maximal tightness, because the pressure of the lip on the shaft adjusts itself as a function of the pressure prevailing around the lip.

In a first preferred embodiment of the present invention, the fluid connection between the gap and the gear chamber is carried out by a pressure equalization channel provided in the first rotating shaft and/or in the second rotating shaft. This makes it possible to equalize easily the pressure between the gap present between the shaft seals of the two pairs of seals and the gear chamber.

In another preferred embodiment of the present invention, the device comprises a lubricating fluid filter between the pressure equalization channel and the gear chamber. Thanks to the lubricating fluid filter, it is possible to prevent the lubricating fluid from being able to enter the pressure equalization channel and thus to spread into the pumping chamber.

In a preferred embodiment according to the present invention, a regulation inlet is provided to control the pressure in the pressure equalization chamber from outside the device. It is thus possible to introduce into the pressure equalization chamber a gas, for example air, nitrogen, helium, hydrogen, neon, argon, krypton, xenon or a mixture of these, in order to regulate the pressure in this chamber from outside the device.

In still another preferred embodiment of the present invention, the pulsation attenuation chamber is in fluid connection with the pressure equalization chamber by means of a membrane permeable to gaseous hydrogen but impermeable at least to water molecules in liquid and gaseous form. The fluid connection between the pulsation attenuation chamber and the gap makes possible an automatic pressure equalization between the pressure present in the gap, the pulsation attenuation chamber and the gear chamber. Thus it is not necessary to regulate actively the pressure in the gap in this embodiment. Moreover, the presence of the semi-permeable membrane makes it possible to filter the water molecules and to reduce the risk of a contamination of the gear chamber and/or a contamination of the pumping chamber by the lubricating liquid of the gear chamber.

In another preferred embodiment of the present invention, the fluid connection between the pulsation attenuation chamber and the pumping chamber has at least partially the form of a labyrinth. This allows the pulsations to be efficiently attenuated and equalized which are created by the cycles of compression in the pumping chamber. This thus makes it possible to ensure that the pressure acting on the first shaft seals of the first and second pairs of seals remains substantially constant during the use of the device.

In a preferred embodiment according to the present invention, the pulsation attenuation chamber is in fluid connection with a discharge outlet. This makes it possible to discharge condensates, in particular water, that have formed in the pulsation attenuation chamber.

In another preferred embodiment of the present invention, the inlet orifice of the pumping chamber is oriented in such a way as to allow a drainage of a liquid under the effect of gravity. This is particularly advantageous to prevent a reservoir of water from forming in the pumping chamber when the device is at a standstill. Such a reservoir of water can freeze and thus prevent a restart of the device. The drainage of the liquid under the effect of gravity allows a simple design since it does not require a supplementary "active" element.

In still another preferred embodiment of the present invention, the gear chamber and/or the pumping chamber is provided in a material resistant to hydrogen or is covered with a material resistant to hydrogen. This makes it possible to increase the service life of the device.

In other preferred embodiments of the present invention, the device is configured to be used in fuel cells for motor vehicles and is in particular configured:
- to allow a maximal external leakage of hydrogen of 10 Ncm$^3$/h;
- to elevate the pressure of the mixture of gases pumped at the inlet of the fuel cell in a range of pressures going up to 15 bar, particularly from 1.5 to 5 bar absolute;
- to be able to be driven in a control range which extends up to 12 000 rotations per minute at a ratio of 1:20;
- to be able to function in a range of ambient temperature and for input of the at least partially gaseous composition between −40° C. to 100° C.; and/or
- to be able to function at a nominal electrical voltage of 12 to 800 VCC, particularly 24 VCC, 48 VCC, 200 VCC, 400 VCC or 750 VCC.

According to a second aspect, an object of the invention is achieved thanks to a fuel cell system comprising a reservoir of gaseous composition comprising at least partially hydrogen, the reservoir being connected to an inlet of a fuel cell, wherein the system comprises a device for recirculation according to the present invention, an outlet of the fuel cell being connected to the inlet orifice of the device for recirculation and the outlet orifice of the device for recirculation being connected to the inlet of the fuel cell.

Thanks to such a system, the fuel cell can be supplied with gaseous composition not only by means of the reservoir but also by means of the device for recirculation. Thus the hydrogen not consumed in the fuel cell is reintroduced into the fuel cell, limiting the losses of hydrogen and thus increasing the efficiency of the system.

In a first preferred embodiment of this aspect of the present invention, the system comprises a water separator in fluid connection with the outlet of the fuel cell and with the inlet orifice of the device for recirculation. By means of the water separator, it is possible to extract the water from the gaseous composition exiting from the fuel cell before this composition is introduced into the device for recirculation. This makes it possible to avoid introducing too great a quantity of water into the device for recirculation.

In a second preferred embodiment of this aspect of the present invention, the system comprises a relief valve in fluid connection with the discharge outlet of the water separator. The relief valve allows the water to be removed while at the same time preventing return flows. The valve preferably comprises a sensor which allows the quantity of water in the water separator to be measured. When a certain level of water is reached, the relief valve is opened and the water is discharged.

In another preferred embodiment of this aspect of the present invention, the regulation inlet of the device for recirculation is in fluid connection with the reservoir. This allows the gas contained in the reservoir to be introduced into the device for recirculation and makes it possible to equalize the pressure acting on the shaft seals of this device. By equalizing the pressure, a premature attrition of the seals can be avoided.

In still another preferred embodiment of this aspect of the present invention, the discharge outlet of the device for recirculation is in fluid connection with the discharge outlet of the water separator. This permits water to be removed which would want to accumulate in the device for recirculation.

BRIEF DESCRIPTION OF THE DRAWINGS

The particularities and the advantages of the present invention will appear with more details, within the context of the description which follows, with an example of implementation, given by way of illustration and in a non-limiting way, with reference to seventeen attached drawings which represent.

DETAILED DESCRIPTION OF PREFERRED EMBODIMENTS OF THE INVENTION

Figure 1:
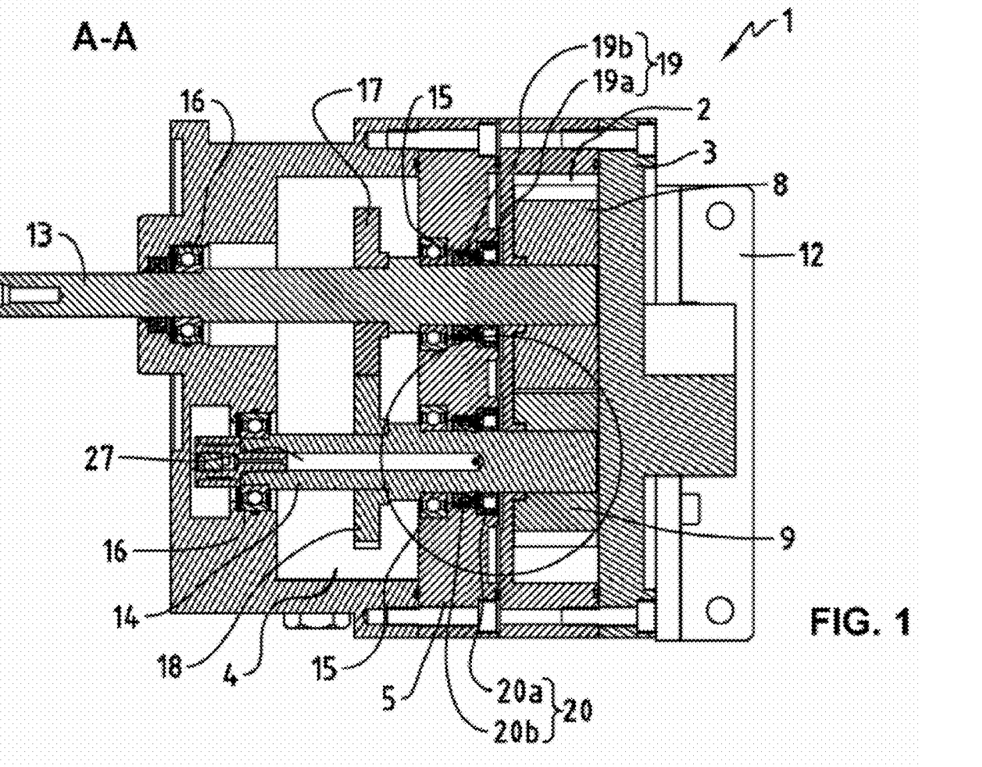
FIG. 1 represents a first sectional view of a device for recirculation of an at least partially gaseous composition containing hydrogen according to a first preferred embodiment.
Figure 1A:
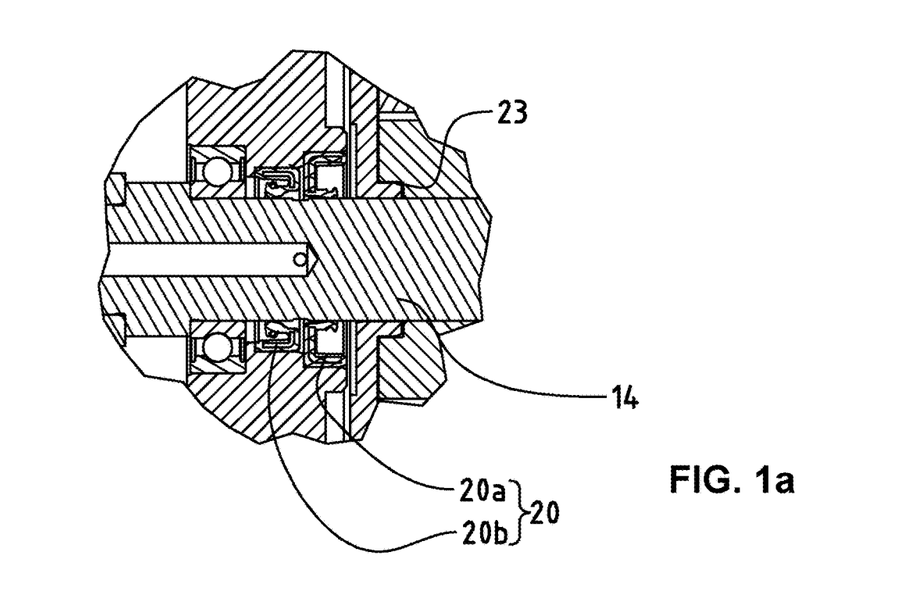
FIG. 1a presents a detail from FIG. 1.
Figure 2:
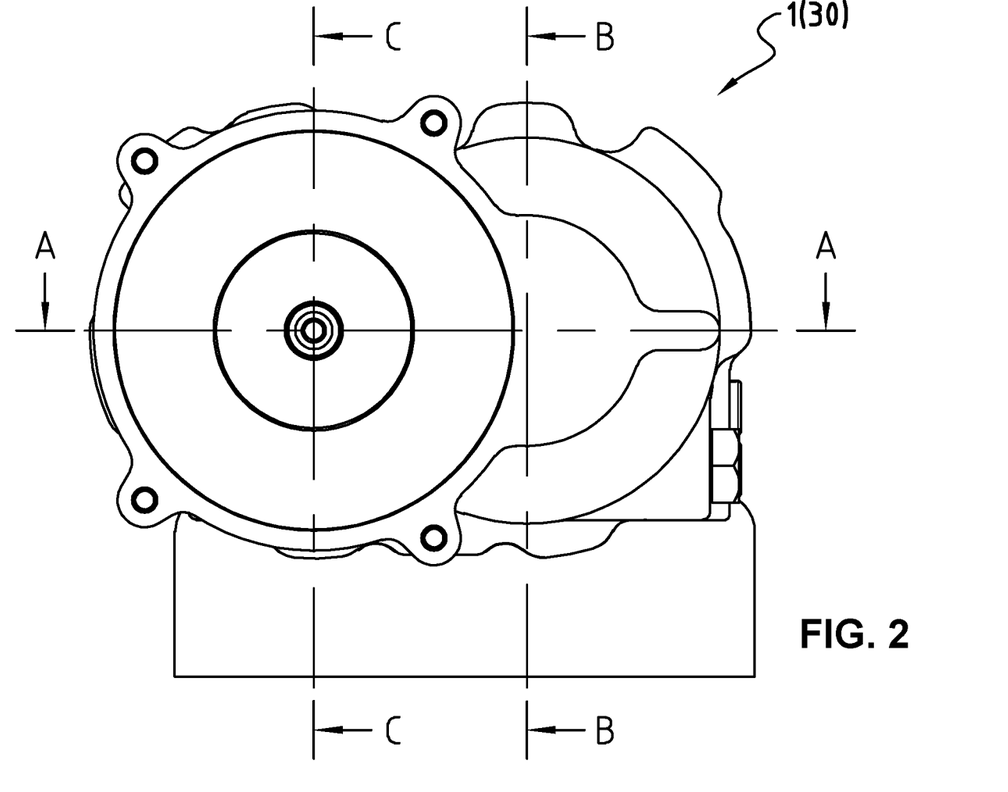
FIG. 2 represents a front view of a device according to the first preferred embodiment.

FIG. 1 presents a sectional view along the line A-A (cf. FIG. 2) of a device 1 for recirculation of an at least partially gaseous composition containing hydrogen according to a first preferred embodiment of the present invention. The device 1, here in the form of a dry claw pump, is composed of a plurality of sub-units which are connected to one another in a removable way, i.e., in the illustrated construction example, a pumping chamber 2 with a pumping chamber cover 3 and a gear chamber 4 with a gear chamber cover 5.

The pumping chamber 2 is provided to receive two pistons with claws 8 and 9 (cf. FIG. 3) driven in rotation by a first rotating shaft 13 and a second rotating shaft 14 supported by bearings 15 and 16, respectively situated in the gear chamber cover 5 and in the gear chamber 4. The rotating shaft 13 of the piston with claws 8 represents the input shaft, whereas the shaft 14 of the piston with claws 9 forms the output shaft. The rotating shaft 13 is configured to be driven by an electric motor in a way known to one skilled in the art and which will not be described in detail here.

The driving of the second rotating shaft 14 of the piston with claws 9 as well as its necessary synchronization with the first rotating shaft 13 of the piston with claws 8 is carried out by a drive system comprising two toothed wheels 17 and 18 which mesh between the two bearings 15 and 16. In order to permit an optimal driving of the toothed wheel 18 by the toothed wheel 17, the gear chamber 4 contains a lubricating liquid. It is advantageous, for use of the device 1 for recirculation of a composition containing hydrogen, to see to it that the lubricating liquid is adapted to this field of application. It is in particular advantageous to provide a lubricating liquid non-reactive with hydrogen and compatible with the materials used for the membranes of a fuel cell.

Figure 3:
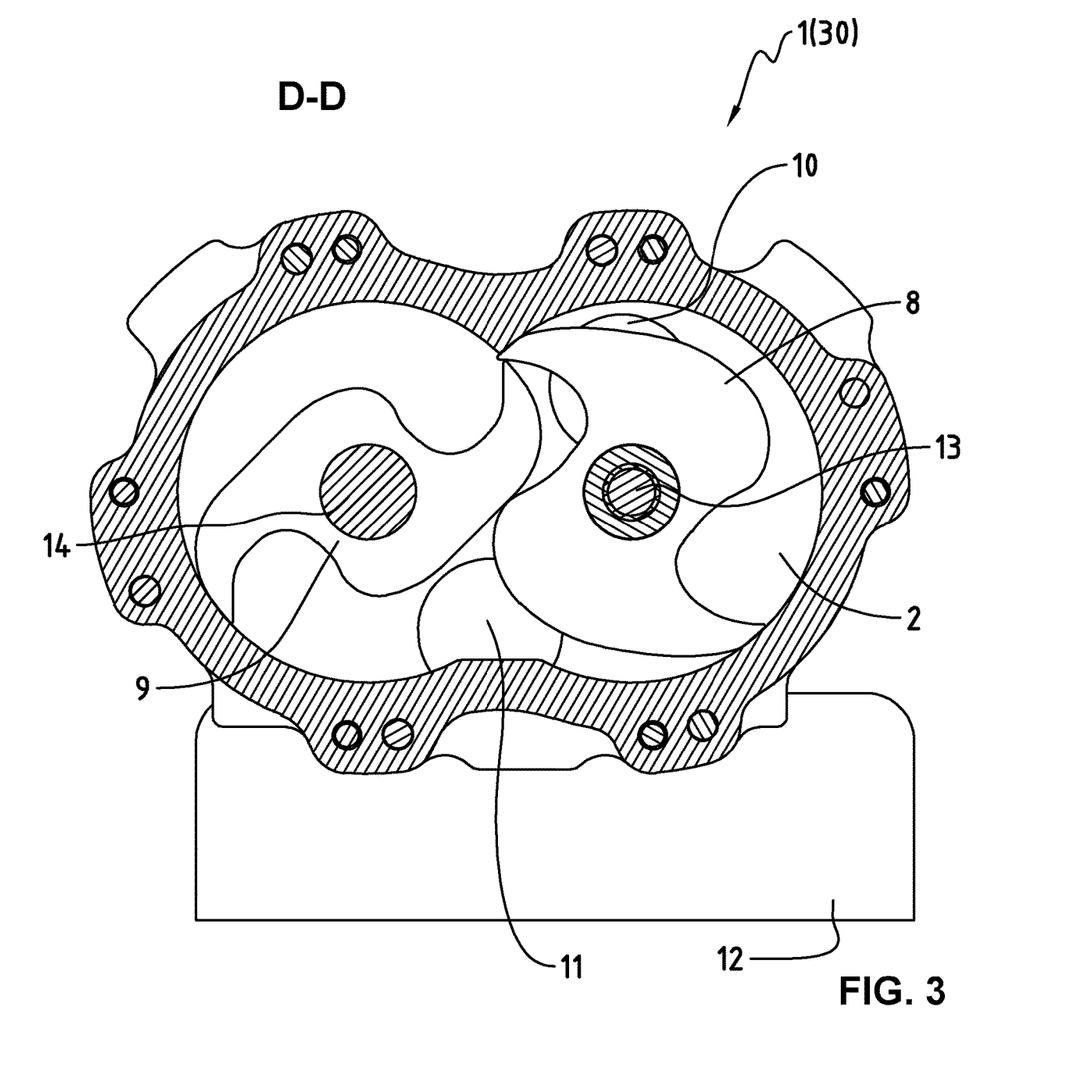
FIG. 3 represents a second sectional view of a device according to the first preferred embodiment.

As illustrated in FIG. 3, the pistons 8 and 9 are pistons with claws configured to be able to be rolled or wrapped, one against the other, in such a way that they transport and compress efficiently the gaseous composition entering through an inlet orifice 11 and exiting through the outlet orifice 10. The inlet orifice 11 is advantageously oriented in such a fashion that a liquid present in the pumping chamber 2 can flow out of this chamber under the effect of gravity when the device 1 is oriented as in FIG. 1, that is to say it rests on the base 12.

As mentioned above, it is important that the device for recirculation 1 is configured in such a fashion so as to prevent water in liquid or gaseous form from being able to enter the gear chamber 4 and/or lubricating liquid from being able to contaminate the pumping chamber 2. In fact, some of the water could react with the lubricating liquid present in the gear chamber 4 and/or prevent an optimal driving of the toothed wheels 17 and 18 and/or of the bearings 15 and 16 which in the long term would lead to a malfunction of the device 1. Moreover, a contamination of the pumping chamber 2 with some of the lubricating liquid could lead to a decrease in performance of the fuel cell to which the device 1 is connected.

In order to separate the pumping chamber from the gear chamber of a claw pump, it is known in the prior art to use a shaft seal in rubber positioned between the pumping chamber and the gear chamber. This normally makes it possible to prevent water contained in the partially gaseous composition supplied to the fuel cell from being able to enter the gear chamber and lubricating liquid from being able to contaminate the pumping chamber.

In a preferred embodiment, the shaft seals normally positioned around the rotating shafts driving the pistons with claws are of lip type in such a way that the seal lip is in contact with the rotating shaft and that under the effect of the elasticity of the lip an optimal tightness is attained. The shaft seals can be of a different nature, of mechanical seal type, labyrinth or other.

As previously mentioned, the object of the present invention is to provide a device 1 for the recirculation of hydrogen which is usable in the field of fuel cells and more specifically in the field of fuel cells for motor vehicles. In this field of application, the pressure of the composition containing the hydrogen to be recirculated can vary enormously, which means that the pressure which is applied on the lip of the shaft seal can also vary a lot. With a great pressure, a great frictional force is created between the lip of the seals and the rotating shaft around which they are positioned, which can lead to a rapid attrition of the lip. A worn lip no longer allows the necessary tightness to be achieved and some of the water in gaseous or liquid form can enter the gear chamber or some lubricating liquid can contaminate the pumping chamber.

In order to solve this problem, the device 1 comprises, as shown in the different figures, a first pair of seals 19 comprising a first shaft seal 19a and a second shaft seal 19b, which are placed around the first rotating shaft 13, and a second pair of seals 20 comprising a first shaft seal 20a and a second shaft seal 20b, which are placed around the second rotating shaft 14. As mentioned above, a shaft seal is a seal of the shaft, that is to say that the greater the difference in pressure between the two sides of the seal the more the lip presses on the rotating shaft around which the seal is positioned. This implies that with a growing difference in pressure the frictional forces between the lip of the seal and the shaft increase. Such an increase can cause a premature attrition, and possibly a break of the seal.

Figure 4:
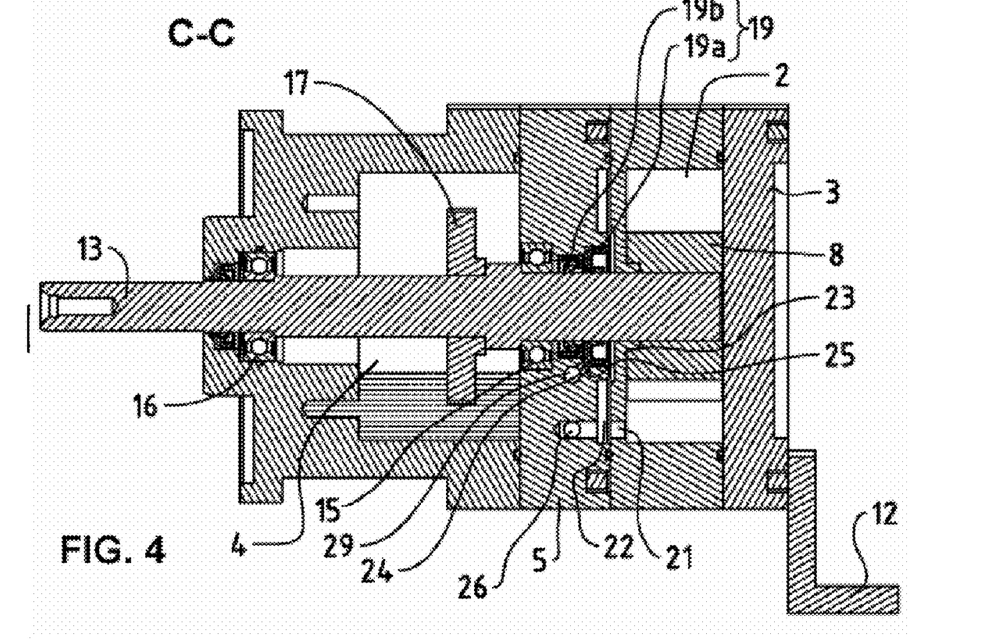
FIG. 4 represents a third sectional view of a device according to the first preferred embodiment.
Figure 5:
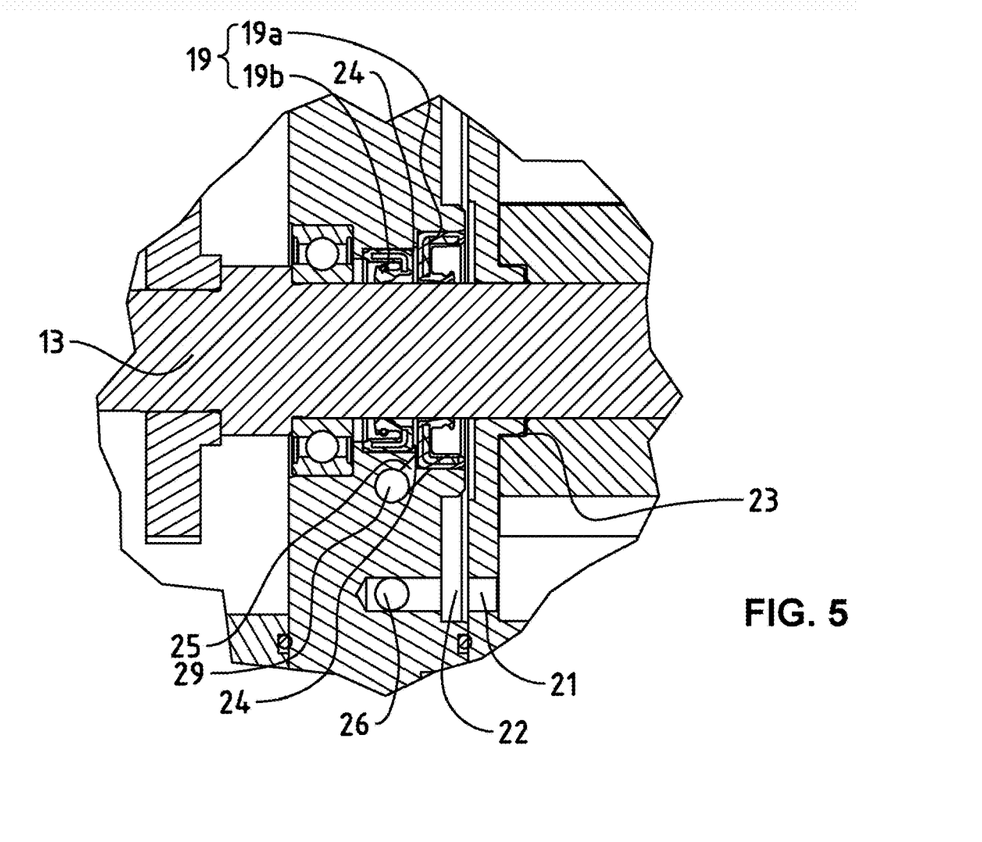
FIG. 5 presents a detail from FIG. 4.

To prevent premature attrition of the seals of the pairs of seals 19 and 20, the device 1 comprises a pressure equalization system so that the pressure on the two sides of the shaft seals can be equalized. As illustrated in FIGS. 4 and 5, the device 1 comprises a pressure equalization chamber 25 which is in fluid connection with the gap 24 present between the first and second shaft seals of the pairs of seals 19 and 20. The pressure in the pressure equalization chamber 25 can be regulated by introducing a gas there, from the outside of the device, by a regulation inlet 29. This thus makes it possible to control the pressure in the pressure equalization chamber 25 and the gap 24 and thus equalize the pressure which acts upon the two sides of the shaft seals.

As can be seen from these figures, the pumping chamber 2 is moreover in fluid connection with a pulsation attenuation chamber 22 by a hole 21. The pulsation attenuation chamber 22 is itself in fluid connection with the first shaft seals 19a and 20a of the pairs of seals 19 and 20. Thanks to the pulsation attenuation chamber 22, it is possible to attenuate and even equalize the pressure pulsations which are created during the pumping cycles in the pumping chamber 2 and thus to ensure that the pressure acting on the lip of the first shaft seals 19a and 20a remains substantially constant during the use of the device 1. This is important to ensure an optimal tightness. The fluid connection between the pulsation attenuation chamber 22 and the pumping chamber 2 takes advantageously the form of a labyrinth 23 with low passage of gas, which makes it possible to attenuate and even equalize efficiently the pressure pulsations.

Figure 6:
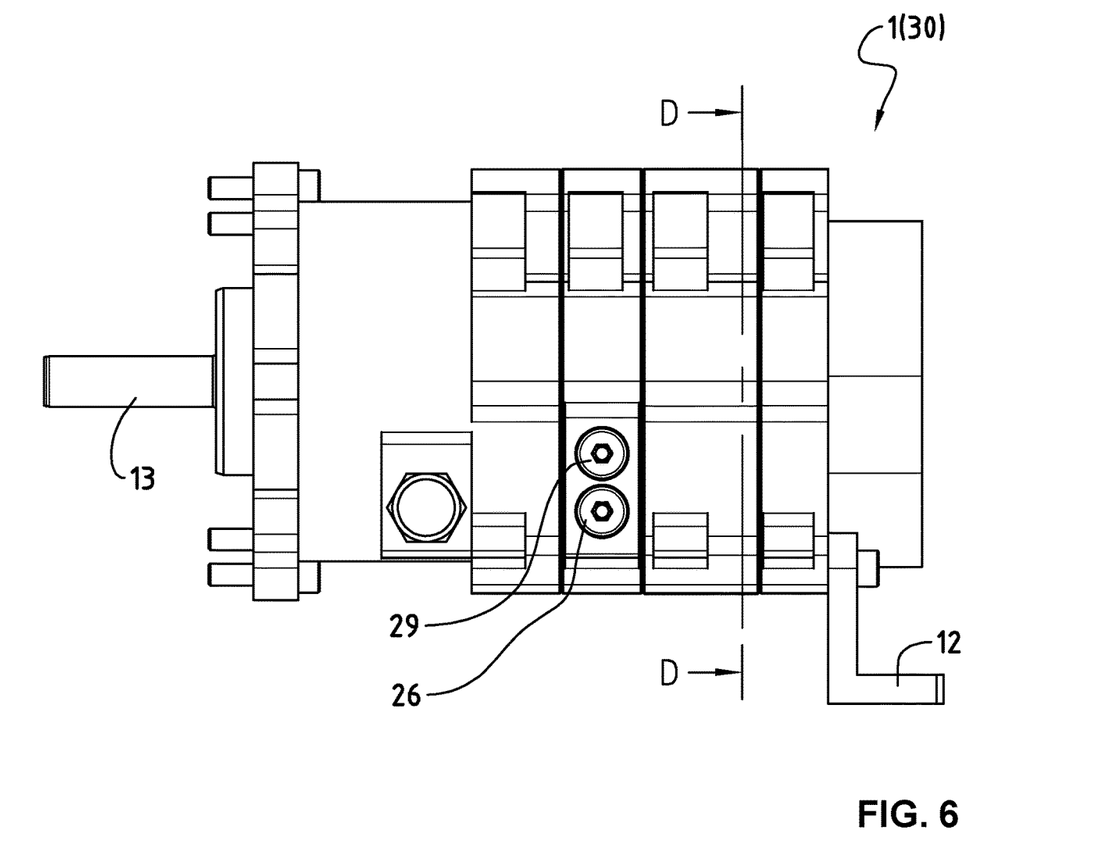
FIG. 6 represents a lateral view of a device according to the first preferred embodiment.

Owing to the fluid connection between the pulsation attenuation chamber 22 and the pumping chamber 2, it is possible for water to be able to accumulate in the pulsation attenuation chamber 22. In this case, it is advantageous to provide a discharge outlet 26 through which the water can be drained (cf. also FIG. 6). Moreover, the water can itself be re-suctioned by the by the cycle of the pumping chamber 2 through the connection hole 21. In addition, by means of the regulation inlet 29, a gas, for example air, nitrogen, helium, hydrogen, neon, argon, krypton, xenon or a mixture of these, can be introduced into the pressure equalization chamber 25 and thus into the gap 24 which makes it possible to equalize easily the pressure acting upon the shaft seals.

Figure 7:
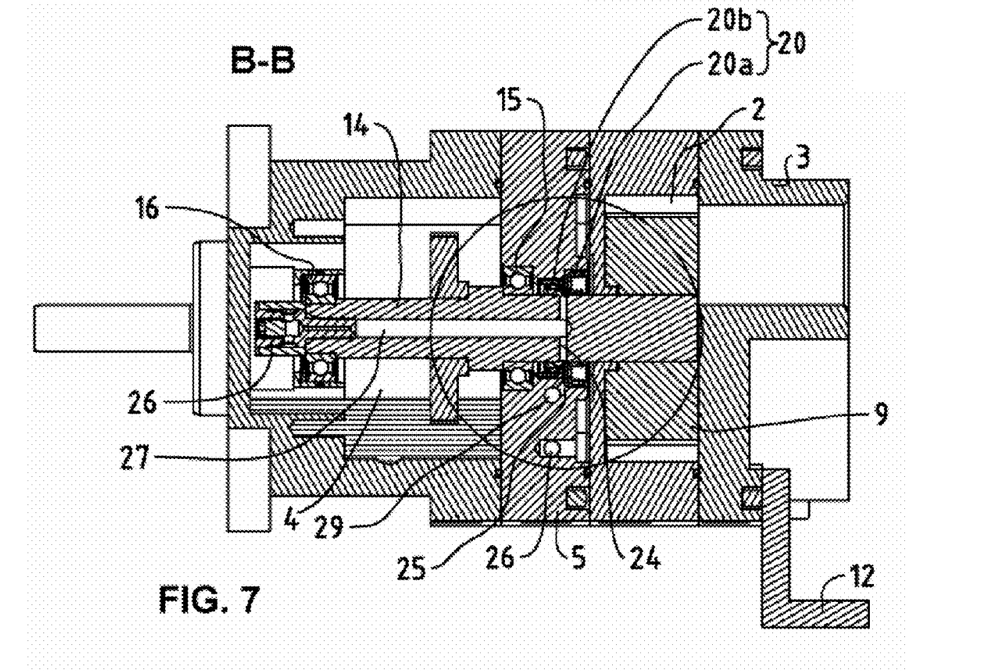
FIG. 7 represents a fourth sectional view of a device according to the first preferred embodiment.
Figure 8:
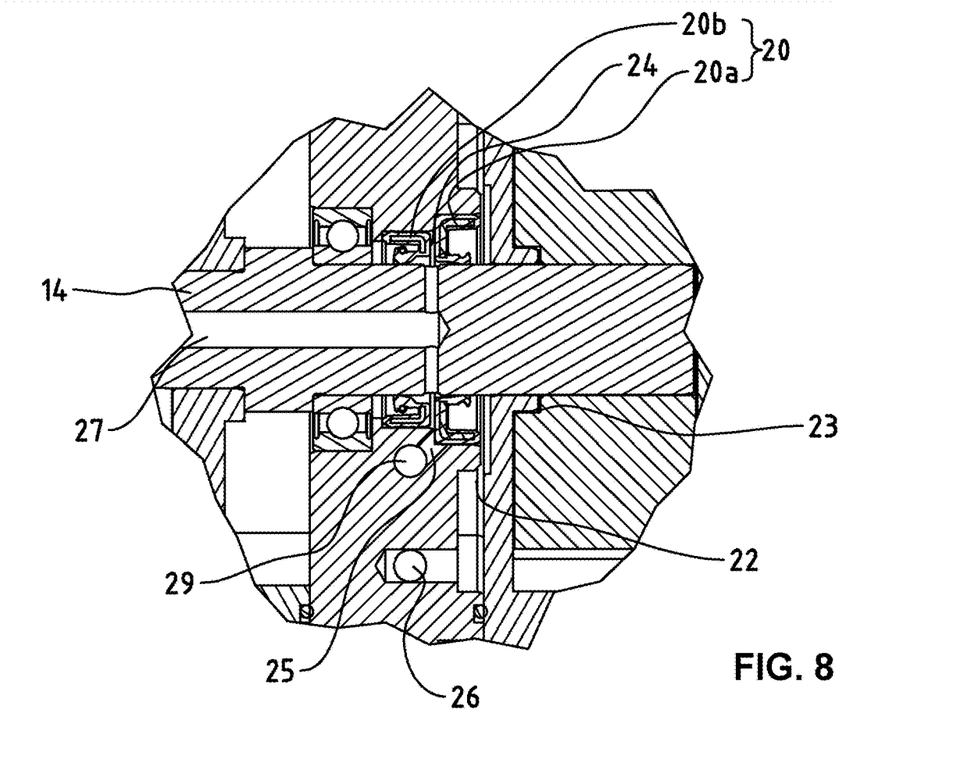
FIG. 8 presents a detail from FIG. 7.

So that not just the seals 19a and 20a but also the seals 19b and 20b do not wear out prematurely, the second rotating shaft 14 comprises a pressure equalization channel 27 which connects the gap 24 to the gear chamber 4 (cf. FIGS. 7 and 8). Thus the pressure acting upon the two sides of the shaft seals 19b and 20b is equalized which reduces the force of friction between the rotating shafts and these seals. In order to avoid a backflow of lubricating liquid into the gap 24 by means of the channel 27, the second rotating shaft 14 comprises a filter 28 at its end in the gear chamber which filter allows the diffusion of gases but not of liquids.

Figure 9:
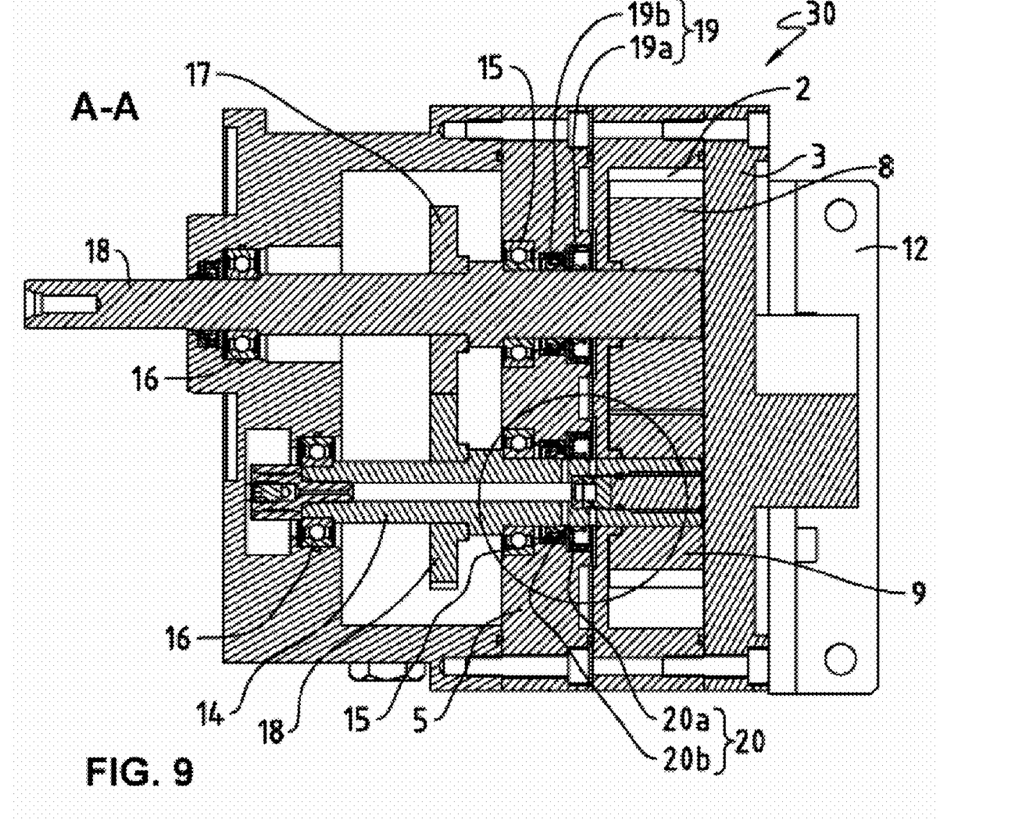
FIG. 9 represents a first sectional view of a device for recirculation of an at least partially gaseous composition containing hydrogen according to a second preferred embodiment.
Figure 10:
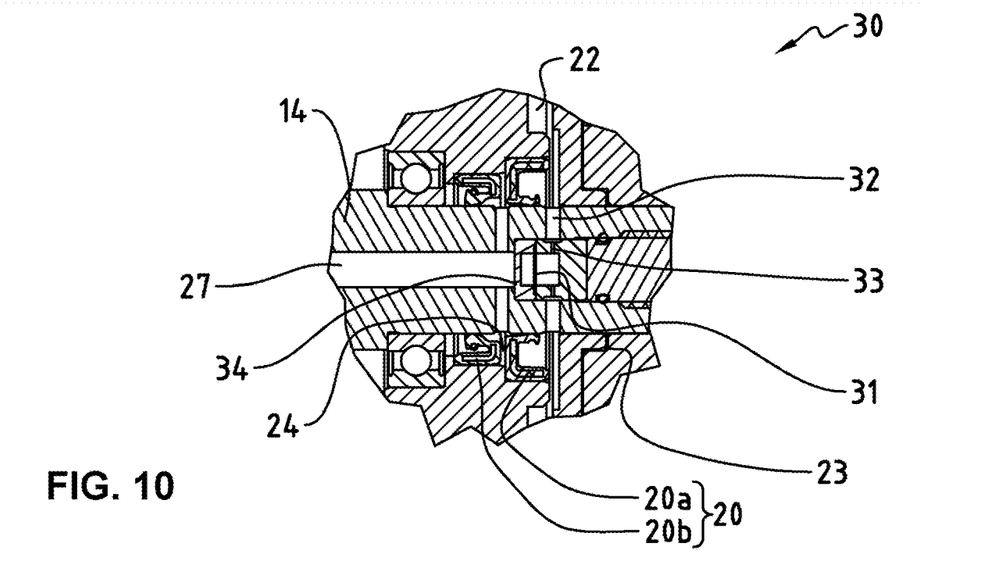
FIG. 10 presents a detail from FIG. 9.
Figure 11:
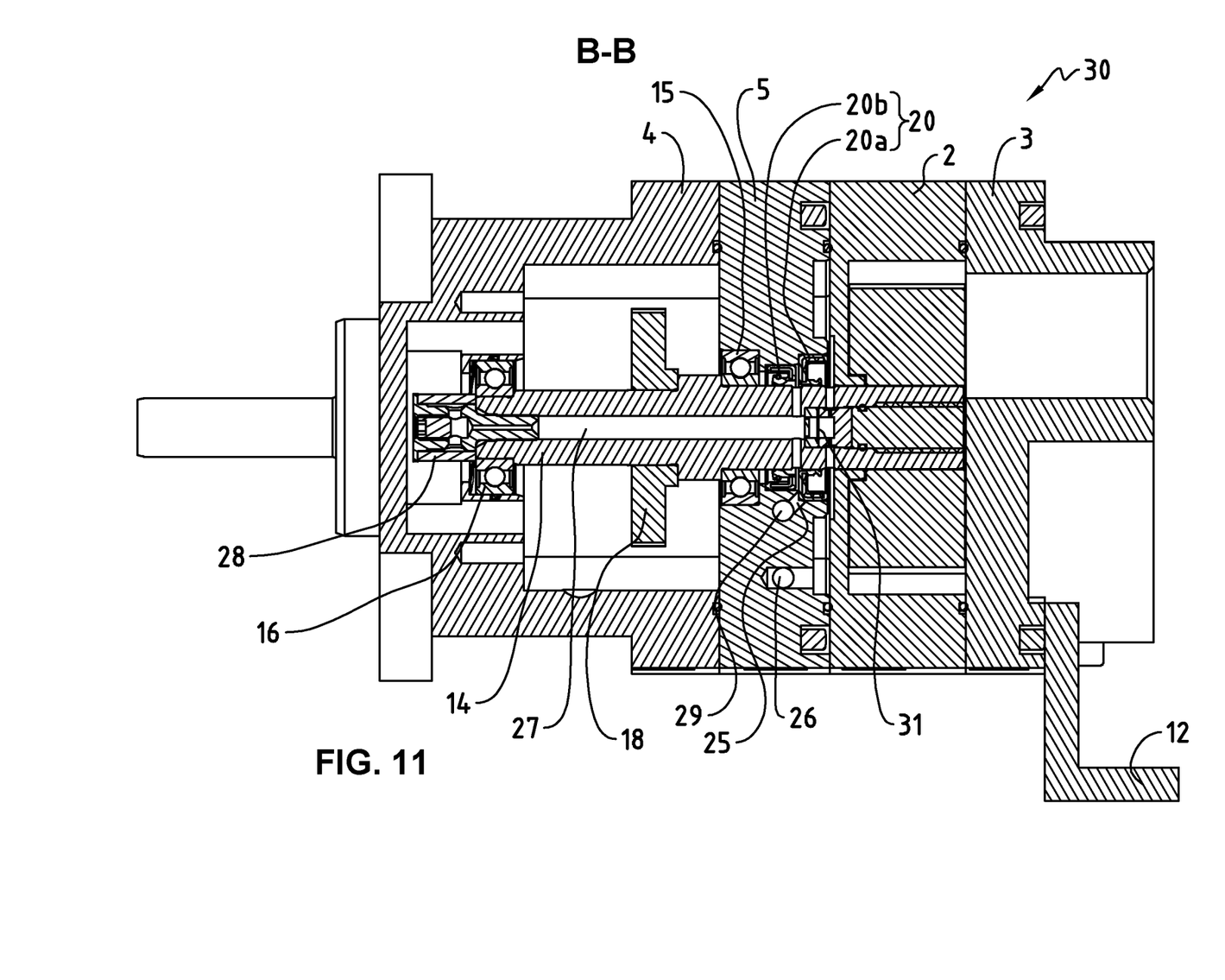
FIG. 11 represents a second sectional view of a device according to the second preferred embodiment.

FIGS. 9 and 10 present a sectional view along the line A-A (cf. FIG. 2) of a device 30 for recirculation of an at least partially gaseous composition containing hydrogen according to a second preferred embodiment of the present invention. Here, we will forego describing the elements of the device 30 that are similar to those of the device 1. Moreover, the similar elements bear the same reference numeral in the figures illustrating the two embodiments.

In the device 30, the pulsation attenuation chamber 22 is in fluid connection with the pressure equalization chamber 25 and thus with the gap 24. This makes possible an automatic equalization of the pressures in the pumping chamber 2, in the gap 24 and in the gear chamber 4. In this embodiment, it is therefore not necessary to regulate actively the pressure in the pressure equalization chamber 25. Thanks to the fluid connection between the pumping chamber 2 and the gap 24 by means of the pulsation attenuation chamber 22, the pressure on the two sides of the shaft seals 19a and 20a of the pairs of seals 19 and 20 is equalized automatically.

Advantageously, the fluid connection between the pulsation attenuation chamber 22 and the pressure equalization chamber 25 is achieved by a semi-permeable membrane 31 through which the gaseous hydrogen can diffuse but which retains the water in liquid or gaseous form as well as the lubricating liquids. In a way similar to the device 1, the fluid connection between the pulsation attenuation chamber 22 and the pumping chamber 2 has at least partially the shape of a labyrinth 23, which makes it possible to attenuate and even equalize efficiently the pressure pulsations coming from the pumping chamber 2. In addition, as can be seen in FIG. 10, the fluid connection between the pulsation attenuation chamber 22 and the gap 24 (and thus the pressure equalization chamber 25) is achieved advantageously by a first pair of calibrated holes 32, a second pair of calibrated holes 33 and a third pair of calibrated holes 34. The size of the calibrated holes 33 makes it possible to control the rate of flow of the gaseous composition along the membrane 31. In a way similar to the device 1, a discharge outlet 26 allows the discharge of the water which would want to accumulate in the pulsation attenuation chamber 22. In the device 30, the discharge outlet 26 is configured to discharge the water which is pushed back under the effect of the centrifugal force through the calibrated holes 32. Finally, a regulation inlet 29 to regulate the pressure in the pressure equalization chamber 25 from outside the device is also provided in this embodiment.

The presence of the membrane 31 makes it possible to reduce still further the risk of diffusion of water molecules in the gear chamber 4 and of lubricating liquid in the pumping chamber 2. It is important to note that, in a manner similar to device 1, the pressure on the two sides of the shaft seals of the pairs of seals 19 and 20 is equalized which makes it possible to limit their wear and tear. Moreover, as illustrated in FIG. 9, the second rotating shaft 14 of the device 30 also comprises at one of its ends a filter 28 which prevents the backflow of the lubricating liquid present in the gear chamber through the channel 27.

Figure 12:
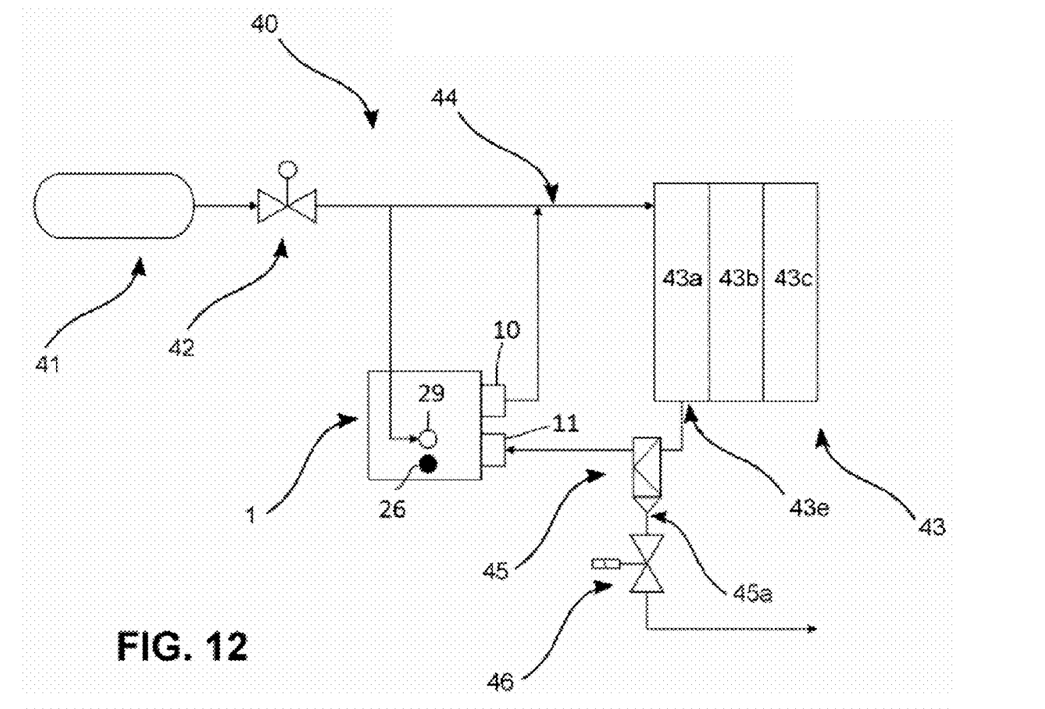
FIG. 12 illustrates diagrammatically a fuel cell system according to a first embodiment of the present invention.

FIG. 12 shows a fuel cell system 40 according to a first embodiment of the present invention. The system 40 comprises a hydrogen reservoir 41, a pressure regulator 42, a fuel cell 43 with an anode 43a, a membrane 43b and a cathode 43c. The system 40 also comprises a device 1 for recirculation of the at least partially gaseous composition containing hydrogen according to a first embodiment of this aspect of the present invention. The outlet orifice 10 of the device 1 is connected to pipe 44 supplying the gaseous hydrogen to the fuel cell 43, which makes it possible to re-introduce the non-consumed hydrogen into the fuel cell. The outlet 43e of the fuel cell 43 is connected to a water separator 45 which allows removal of a majority of the water contained in the gaseous composition exiting from the fuel cell. This water is discharged by way of the discharge outlet 45a of the water separator 45 and through a relief valve 46. The gaseous composition, of which a large portion of the water has been removed thanks to the water separator 45, is introduced into the device 1 through its inlet orifice 11. The device 1 can thus compress the gaseous composition to the necessary pressure and re-introduce it into the pipe 44. In this embodiment, the regulation inlet 29 of the device 1 is in connection with the pipe 44, and thus with the reservoir 41, which allows the equalization of the pressure acting upon the two sides of the shaft seals (not shown here) of the device 1. As illustrated in FIG. 12, the discharge outlet 26 is, in this embodiment, not used and is preferably closed.

Figure 13:
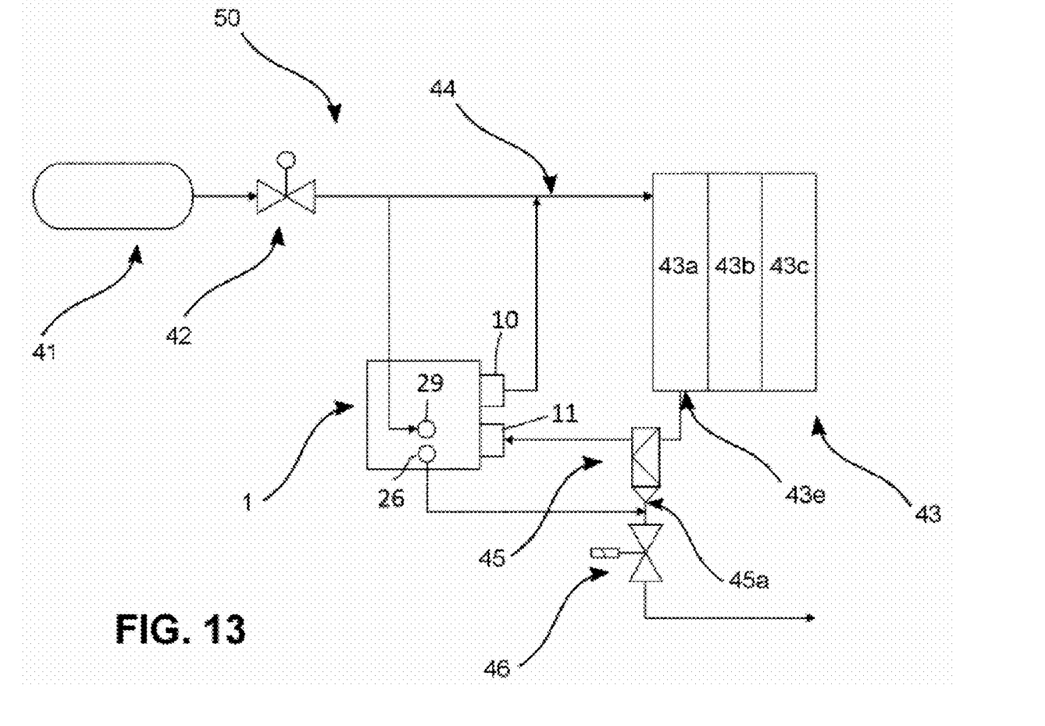
FIG. 13 illustrates diagrammatically a fuel cell system according to a second embodiment of the present invention.

FIG. 13 shows a fuel cell system 50 according to a second embodiment of the present invention. The system 50 is equivalent to the system 40 presented in FIG. 12 with the exception of the fact that the discharge outlet 26 is, in this embodiment, connected to the outlet of the water separator 45. This makes it possible to expel the water which would want to form inside the device 1.

Figure 14:
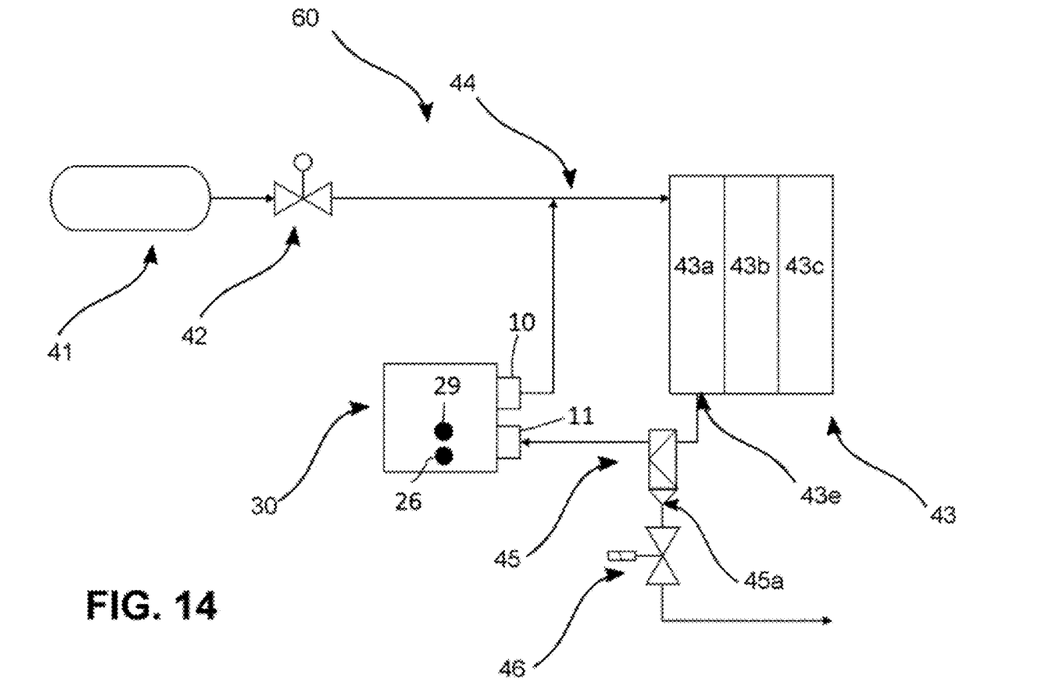
FIG. 14 illustrates diagrammatically a fuel cell system according to a third embodiment of the present invention.

FIG. 14 shows a fuel cell system 60 according to a third embodiment of the present invention. The system 60 is equivalent to the system 40 presented in FIG. 12 except for one important difference. This difference resides in the fact that the system 60 comprises a device 30 for recirculation of the at least partially gaseous composition containing hydrogen according to the second embodiment of this aspect of the present invention. As mentioned above, this embodiment of the recirculation device provides for a system of automatic equalization of the pressure acting upon the two sides of the shaft seals (not shown here) of the device 30. Thanks to this automatic equalization system, it is not necessary to introduce a gas through the regulation inlet 29 in order to equalize the pressure acting upon the shaft seals. Thus, in the embodiment of FIG. 14, the regulation inlet 29 is not connected to the pipe 44. It is important to note that in this embodiment, it would also be possible to provide a connection between the regulation inlet 29 and the pipe 44 in order to allow, if necessary, a gas to be introduced into the device 30. This would be necessary, for example, if the automatic equalization device did not function as desired.

Figure 15:
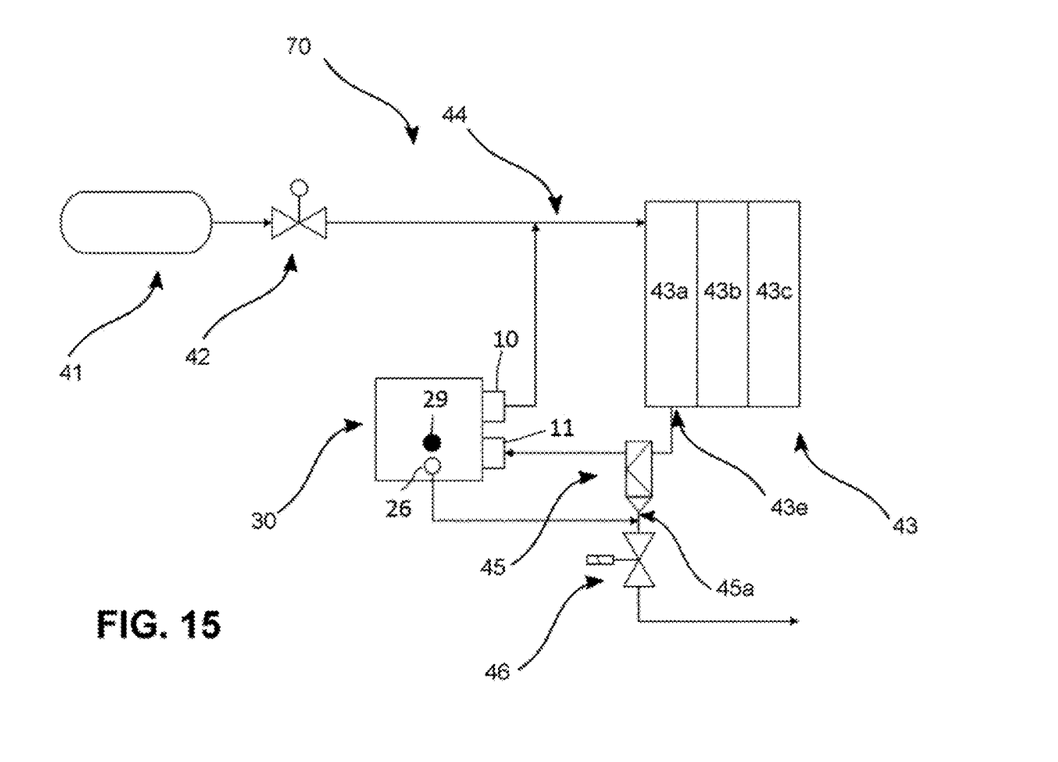
FIG. 15 illustrates diagrammatically a fuel cell system according to a fourth embodiment of the present invention.

FIG. 15 shows a fuel cell system 70 according to a fourth embodiment of the present invention. The system 70 is equivalent to system 60 presented in FIG. 14 except for the fact that the discharge outlet 26 is, in this embodiment, connected to the outlet of the water separator 45. This allows the removal of the water which would want to form inside the device 30.

Figure 16:
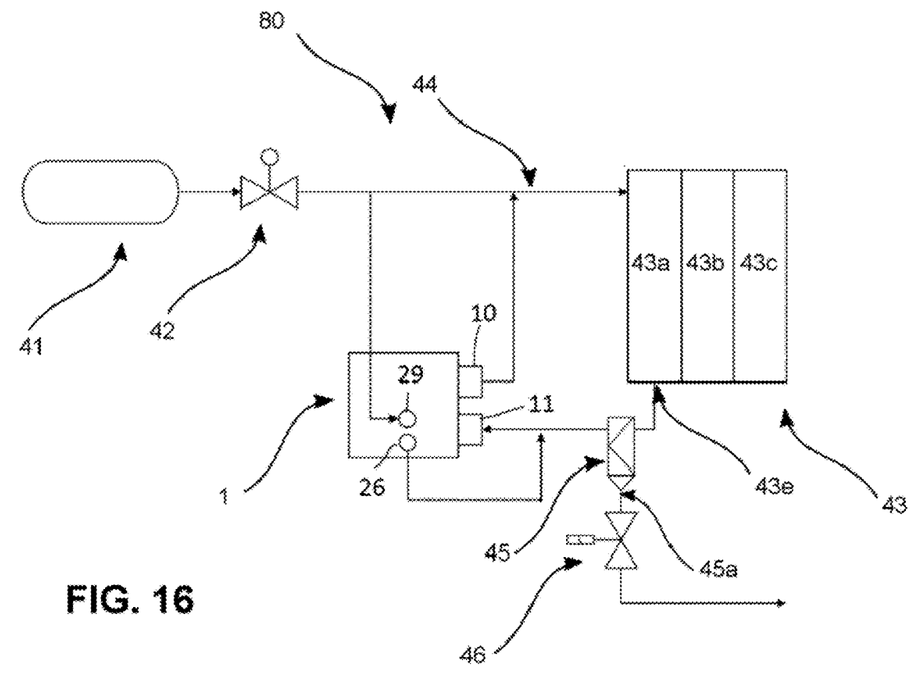
FIG. 16 illustrates diagrammatically a fuel cell system according to a fifth embodiment of the present invention.
Figure 17:
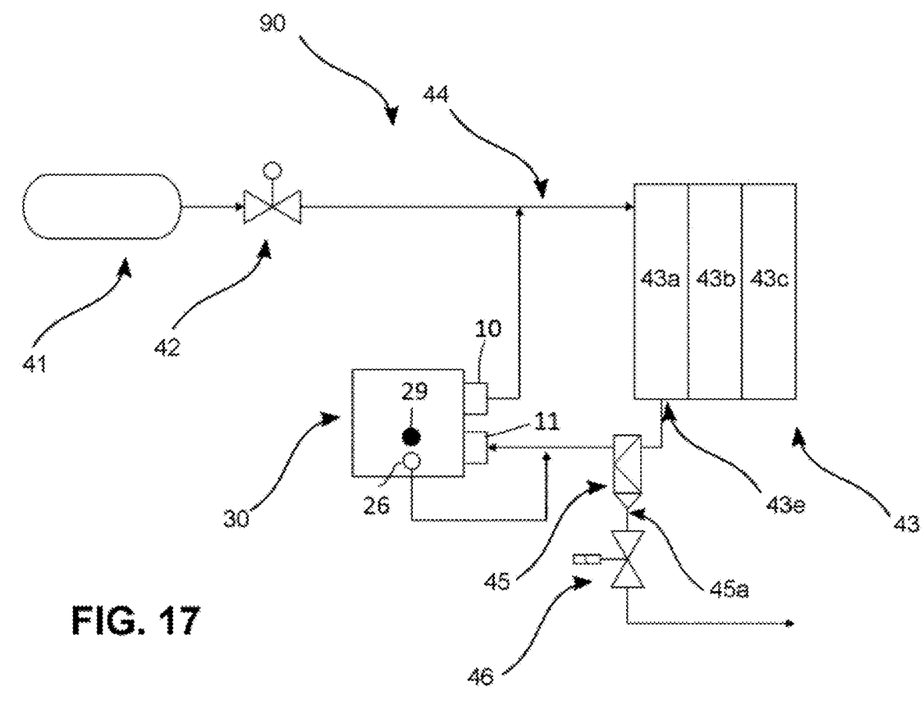
FIG. 17 illustrates diagrammatically a fuel cell system according to a sixth embodiment of the present invention.

FIGS. 16 and 17 show, for their part, a fuel cell system 80, 90 according to a fifth and a sixth embodiment of the present invention. In these embodiments, the discharge outlet 26 is in fluid connection with the inlet orifice 11 of the recirculation device 1, respectively of the recirculation device 30. This makes it possible to remove the water which would want to form inside of the recirculation device and to re-introduce this water in the fuel cell 43 by means of the recirculation device 1, 30 and the pipe 44.

It is evident that the present invention is subject to various variations for its implementation. Although a non-limiting embodiment has been described by way of example, it is well understood that it is not conceivable to identify in an exhaustive way all the possible variations. It can of course be envisaged to replace a described means with an equivalent means without departing from the scope of the present invention. All these modifications form part of the common knowledge of one skilled in the art in the field of pumps and circulators.

The invention claimed is:

1. A dry rotary pump for recirculation of an at least partially gaseous composition containing hydrogen, the dry rotary pump comprising a first rotating shaft and a second rotating shaft driving respectively a first piston with claws and a second piston with claws in rotation in a pumping chamber comprising an inlet orifice and an outlet orifice for the gaseous composition, the first rotating shaft and the second rotating shaft being configured to be driven in rotation by a drive situated in a gear chamber,
 a first pair of seals and a second pair of seals, each comprising a first shaft seal and a second shaft seal, the first pair of seals being provided around the first rotating shaft and the second pair of seals being provided around the second rotating shaft between the pumping chamber and the gear chamber,
 a pressure equalization chamber in fluid connection with a gap present between the first shaft seal and the second shaft seal of the first and of the second pair of shaft seals to regulate a pressure in the gap,
 the gear chamber being in fluid connection with the gap, and
 the pumping chamber being in fluid connection with the first shaft seal of the first pair of shaft seals and with the first shaft seal of the second pair of shaft seals by a pulsation attenuation chamber.

2. The dry rotary pump according to claim 1, wherein at least one of the shaft seals among the first shaft seal of the first pair of shaft seals, the second shaft seal of the first pair of shaft seals, the first shaft seal of the second pair of shaft seals and the second shaft seal of the second pair of shaft seals is a lip seal.

3. The dry rotary pump according to claim 1, wherein the fluid connection between the gap and the gear chamber is carried out by a pressure equalization channel provided in the first rotating shaft and/or in the second rotating shaft.

4. The dry rotary pump according to claim 3, comprising a lubricating fluid filter between the pressure equalization channel and the gear chamber.

5. The dry rotary pump according to claim 1, wherein a regulation inlet is provided to control pressure in the pressure equalization chamber from outside the dry rotary pump.

6. The dry rotary pump according to claim 1, wherein the pulsation attenuation chamber is in fluid connection with the pressure equalization chamber by a membrane permeable to gaseous hydrogen but impermeable at least to water molecules in liquid and gaseous form.

7. The dry rotary pump according to claim 1, wherein the fluid connection between the pulsation attenuation chamber and the pumping chamber has at least partially the form of a labyrinth.

8. The dry rotary pump according to claim 1, wherein the pulsation attenuation chamber is in fluid connection with a discharge outlet.

9. The dry rotary pump according to claim 1, wherein the inlet orifice of the pumping chamber is oriented in such a way as to allow a drainage of a liquid under the effect of gravity.

10. The dry rotary pump according to claim 1, wherein at least one of the gear chamber or the pumping chamber is provided in a material resistant to hydrogen or is covered with a material resistant to hydrogen.

11. The dry rotary pump according to claim 1, the dry rotary pump being configured to allow a maximal external leakage of hydrogen of 10 Ncm$^3$/h.

12. The dry rotary pump according to claim 1, the dry rotary pump being configured to be able to be driven in a control range which extends up to 12 000 rotations per minute at a ratio of 1:20.

13. The dry rotary pump according to claim 1, the dry rotary pump being configured to be able to function in a range of ambient temperature and for input of the at least partially gaseous composition between −40° C. to 100° C.

14. The dry rotary pump according to claim 1, the dry rotary pump being configured to function at a nominal electrical voltage of 12 to 800 VCC.

15. The dry rotary pump according to claim 1, the dry rotary pump being configured to elevate the pressure of the at least partially gaseous composition containing hydrogen at the inlet of a fuel cell in a range of pressure going up to 15.

16. A fuel cell system comprising a gaseous composition reservoir containing at least partially hydrogen, the reservoir being connected to an inlet of a fuel cell, wherein the fuel cell system comprises the dry rotary pump for recirculation according to claim 1, an outlet of the fuel cell being connected to the inlet orifice of the dry rotary pump for recirculation and the outlet orifice of the dry rotary pump for recirculation being connected to the inlet of the fuel cell.

17. The fuel cell system according to claim 16, comprising a water separator in fluid connection with the outlet of the fuel cell and with the inlet orifice of the dry rotary pump for recirculation.

18. The fuel cell system according to claim 17, comprising a relief valve in fluid connection with a discharge outlet of the water separator.

19. The fuel cell system according to claim 16, wherein the regulation inlet of the dry rotary pump for recirculation is in fluid connection with the reservoir.

20. The fuel cell system according to claim 16, wherein the discharge outlet of the dry rotary pump for recirculation is in fluid connection with a discharge outlet of a water separator.

* * * * *